(12) United States Patent
Mori et al.

(10) Patent No.: US 7,358,928 B2
(45) Date of Patent: Apr. 15, 2008

(54) IMAGE DISPLAY SYSTEM

(75) Inventors: Kengo Mori, Ashigarakami-gun (JP); Jun Someya, Takatsuki (JP)

(73) Assignees: NEC-Mitsubishi Electric Visual Systems Corporation, Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 508 days.

(21) Appl. No.: 10/659,177

(22) Filed: Sep. 10, 2003

(65) Prior Publication Data

US 2004/0046707 A1    Mar. 11, 2004

(30) Foreign Application Priority Data

Sep. 11, 2002   (JP)   ............... P2002-265441

(51) Int. Cl.
*G09G 5/00* (2006.01)

(52) U.S. Cl. .................... 345/1.1; 345/3.1
(58) Field of Classification Search ........... 345/1.1–3.4
See application file for complete search history.

(56) References Cited

U.S. PATENT DOCUMENTS

| | | | | |
|---|---|---|---|---|
| 5,375,245 A * | 12/1994 | Solhjell et al. | ........... | 713/320 |
| 5,987,614 A * | 11/1999 | Mitchell et al. | ........... | 713/300 |
| 6,049,316 A * | 4/2000 | Nolan et al. | ........... | 345/698 |
| 6,370,603 B1 * | 4/2002 | Silverman et al. | ........... | 710/72 |
| 6,404,423 B1 * | 6/2002 | Kivela et al. | ........... | 345/212 |
| 6,473,078 B1 * | 10/2002 | Ikonen et al. | ........... | 345/211 |
| 6,867,749 B1 * | 3/2005 | II et al. | ........... | 345/1.1 |
| 2002/0118144 A1 * | 8/2002 | Edmonds | ........... | 345/1.1 |
| 2004/0046772 A1 * | 3/2004 | Ouchi et al. | ........... | 345/690 |

FOREIGN PATENT DOCUMENTS

| | | |
|---|---|---|
| EP | 0 772 180 A2 | 5/1997 |
| JP | H8-88820 | 4/1996 |
| JP | 2000-352962 | 12/2000 |
| JP | 2001-166759 | 6/2001 |
| JP | 2001-356752 | 12/2001 |
| JP | 2002-196717 | 7/2002 |

* cited by examiner

*Primary Examiner*—Richard Hjerpe
*Assistant Examiner*—M. Fatatahiyar
(74) *Attorney, Agent, or Firm*—Scully, Scott, Murphy & Presser, P.C.

(57) ABSTRACT

An MPU storage device 114 stores a device address of an image display device 11, and an MPU identification processing device 113 acquires and retains the device address stored in the MPU storage device 114. The MPU identification processing device 113 acquires the device address from a device information storage device 122 or an MPU identification processing device 123 according to a DDC communication protocol, using an output side data sending and receiving device 115. The device information storage device 122 stores EDID, and the MPU identification processing device 113 acquires EDID stored in the device information storage device 112, compares it with the EDID acquired from the image display device 12, extracts common data, and stores it in the device information storage device 112 as common EDID data of the image display device 11 and the image display device 12.

12 Claims, 11 Drawing Sheets

Connection State of Image Display Devices with Different Resolutions and Refresh Rates Fig. 2B
Flow of EDID

Fig. 4A

Connection State of Different Resolutions and Refresh Rates

Fig. 4B

Flow of DDC-CI Data Setting Commands

Fig. 4C
Flow of DDC-CI Data Acquisition Commands

Fig. 5A
Connection Form

Fig. 5B
Image Display Device Power Off Processing

Fig. 8A
Before setting index numbers

Fig. 8B
Index number automatic setting procedure

IMAGE DISPLAY SYSTEM

BACKGROUND OF THE INVENTION

1. Field of the Invention

The present invention relates to an image display system for controlling image display in a multiple monitor environment. More specifically, it relates to an image display system for controlling image display when using a plurality of image display devices such as liquid crystal displays (LCD), CRTs, plasma displays (PDP), field emission displays (FED), digital micromirror devices (DMD), or the like which display image signals of a predetermined format used for personal computers (PC), workstations (WS) and the like.

2. Description of the Related Art

Heretofore, in PCs (or graphic cards) and image display devices, a communication system using signal lines in display signal cables, called DDC (Display Data Channel) has been used. Using this system, a PC operating system (OS) realizes a "plug and play (PnP)" function by which it can identify the optimal display frequency and resolution of an image display device automatically, and an image display system is realized in which a range of image display device adjustments, such as brightness, display position, and color, can be made remotely. Furthermore, in a communication method of an image display system using conventional DDC, remote control from a PC is only possible for an image display system connected directly to the image output terminal of a PC. This type of image display system is disclosed in Japanese Unexamined Patent Application, First Publication No. 2000-352962, and the like.

[Patent Reference 1]

Japanese Unexamined Patent Application, First Publication No. 2000-352962 (FIG. 1, paragraph 0030, lines 1 to 11).

However, in an image display system as described in Japanese Unexamined Patent Application, First Publication No. 2000-352962, if a DDC communication line connected between a PC and image display devices is shared in a multiple monitor environment using indexes, since all image display devices respond to communication at the same time, communication failures such as bus collisions occur. Thus it is difficult for the PC to identify and control the image display devices individually. Furthermore, the PC acquires and interprets information about the recommended resolutions of the image display devices and the upper display frequency limits by DDC communication with the image display devices. However, in a case where image display devices having different recommended resolutions and upper frequency limits are mixed in a multiple monitor environment using indexes, since the PC can output only one resolution and frequency at one time, it is necessary to acquire and interpret resolution and frequency information that satisfies the specifications of all of the image display devices.

SUMMARY OF THE INVENTION

The present invention takes the above problems into consideration with an object of providing an image display system which enables remote control from a PC, and identification of optimal frequency and recommended resolution even in a multiple monitor environment by using a communication system based on conventional DDC between a PC and image display devices, and between image display devices.

To achieve the above object, an image display system of the present invention is an image display system for realizing a multiple monitor system, incorporating an input interface and an output interface, wherein there is provided: a data sending and receiving device which delivers device information to image display devices connected to the input interface and the output interface, an identification processing device which analyzes and processes data acquired by the data sending and receiving devices, and a storage device which stores control information and specification information of image display devices, and device addresses allocated to the image display devices. Using such a construction, by image display devices communicating with each other in a multiple monitor environment, a PC can generate a display output with optimum frequency and refresh rate in a multiple monitor environment.

Furthermore, in an image display system of the present invention, the data sending and receiving device delivers data according to the DDC communication procedure. As a result, duplex communication is possible between a PC and a plurality of connected image display devices. Thus a user can use similar functions as conventional plug and play and remote control functions.

Moreover, an image display system of the present invention uses manufacturers' serial numbers of the image display devices, asset management numbers of the image display devices, or arbitrarily allocated numbers allocated to the image display devices, as device addresses, and the data sending and receiving devices deliver data using these device addresses. This way, image data is transferred to later stage image display devices, and even in a case where a response is required to a DDC-CI command sent from a PC, since a received image display device appends a device address, it is possible to respond to the PC with required data.

Furthermore, in an image display system of the present invention, the identification processing device identifies whether image display devices are connected to an output interface by using the data sending and receiving device, and identifies an operating state of the image display devices connected to the output interface. As a result, it is possible to make all of the image display devices in a multiple monitor environment perform automatic adjustment functions, and use an adjustment function in one image display device to operate and adjust image display devices connected to it remotely, thus enabling remote control between only image display devices without using a PC.

Furthermore, in an image display system of the present invention, the identification processing device reads specification information from image display devices connected to an output interface by using the data sending and receiving device, extracts data common to its own specification data to edit its own specification data, and stores the edited specification data in the storage device. This enables a PC to generate a display output with optimum frequency and refresh rate in a multiple monitor environment.

Moreover, in an image display system of the present invention, the identification processing device operates image display devices connected to an output interface remotely using the data sending and receiving device. This enables the connection states and power off/on states of image display devices to be identified, so that a PC can have a device for administrating the number of image display devices, and inform a user of problems such as the power of the image display device being turned off for some reason, or being cut off while connected. Thus it is possible to provide an easy to use image display system in a multiple monitor environment.

Furthermore, an image display system of the present invention is further provided with a response device which processes index control responses in a multiple monitor environment using indexes, even when it is not physically connected to a host computer. This enables index numbers to be set automatically, thus avoiding an operation to allocate index numbers to each of a plurality of image display devices, so that it is possible to provide an easy to use image display system in a multiple monitor environment.

As described above, according to an image display system of the present invention, image display devices communicate with each other in a multiple monitor environment. Thus a PC can generate a display output with optimum frequency and refresh rate in a multiple monitor environment. Furthermore, since duplex communication is possible between a PC and a plurality of connected image display devices, a user can use similar functions as conventional plug and play and remote control. Moreover, such functions can be realized by software processing without adding and changing hardware on the PC side.

Furthermore, according to an image display system of the present invention, not only is it possible to turn the power of image display devices on and off, but using similar methods enables all of the image display devices in a multiple monitor environment to perform automatic adjustment functions, and use an adjustment function in one image display device to operate and adjust image display devices connected to it remotely, thus providing an image display system allowing remote control between only image display devices without using a PC.

Moreover, according to an image display system of the present invention, the above-described operations enable the connection states and power off/on states of image display devices to be identified, so that a PC can have a device for administrating the number of image display devices, and inform a user of problems such as the power of an image display device being turned off for some reason, or being cut off while connected. Thus it is possible to provide an easy to use image display system in a multiple monitor environment.

Furthermore, according to an image display system of the present invention, it is possible to allocate index numbers automatically, thus avoiding an operation to allocate index numbers to each of a plurality of image display devices, so that it is possible to provide an easy to use image display system in a multiple monitor environment.

BRIEF DESCRIPTION OF THE DRAWINGS

FIGS. 4A to 4C are explanatory diagrams of a case where the image display system shown in FIG. 1 performs command analysis processing associated with device control.

FIGS. 5A and 5B are diagrams showing a device control procedure in an image display system according to a second embodiment of the present invention.

FIGS. 8A to 8C show the structure and operation flow of an image display system according to a fifth embodiment of the present invention.

DETAILED DESCRIPTION OF THE INVENTION

Hereunder is a detailed description of a number of embodiments of an image display system of the present invention with reference to the figures. The image display system of the present invention is an improvement on an image display system for performing multiple display using index control, which is disclosed in Japanese Unexamined Patent Application, First Publication No. 2000-352962.

First Embodiment

Figure 1:
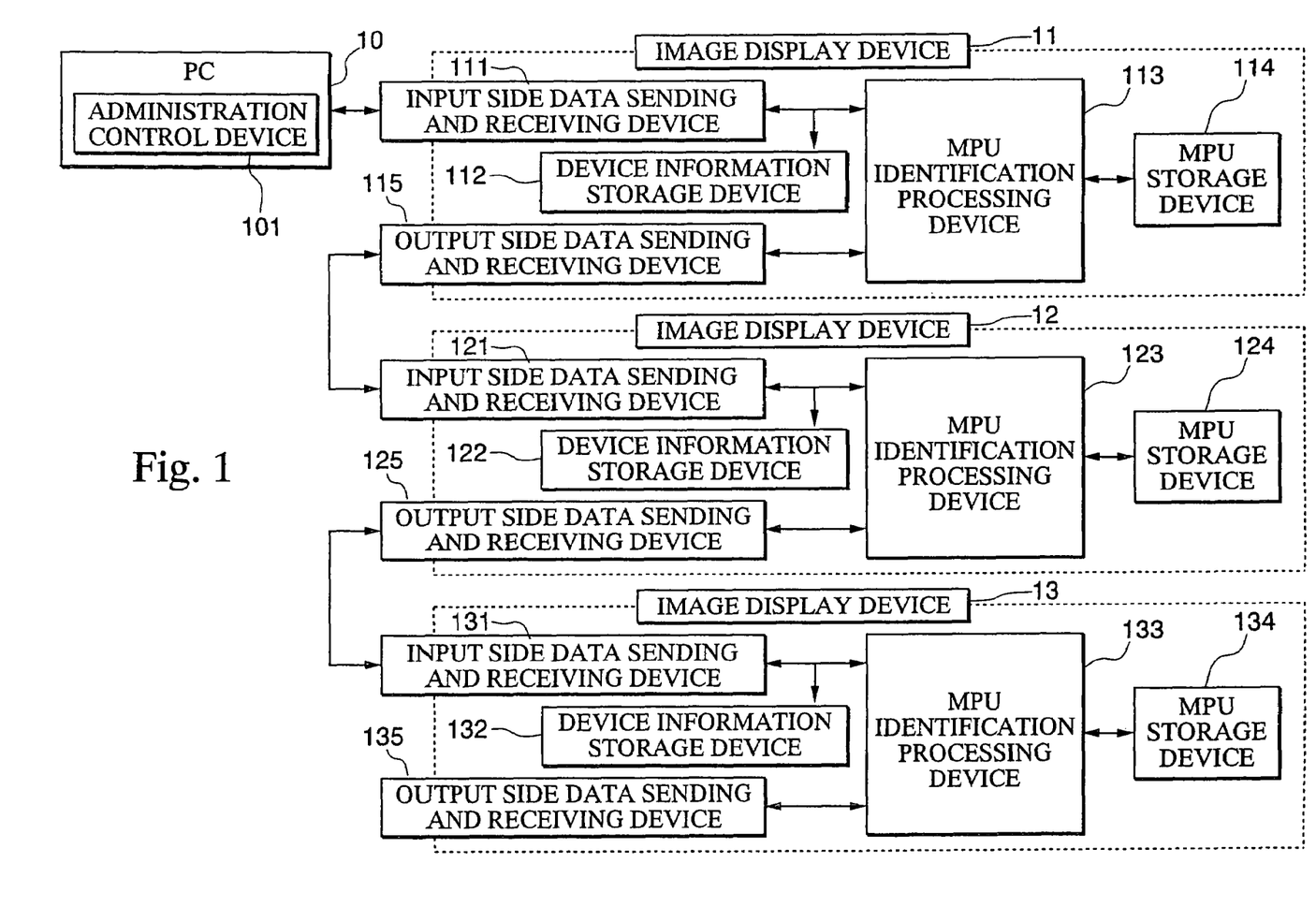
FIG. 1 is a block diagram showing the structure of an image display system according to a first embodiment of the present invention.

FIG. 1 is a block diagram showing the structure of an image display system according to a first embodiment of the present invention. In the structure of the image display system shown in FIG. 1, a PC 10 containing a graphic function and a graphic card communicates with image display devices 11, 12 and 13 connected in series. Furthermore, the PC 10 is provided with an administration and control device 101 for administrating and controlling the graphic function or graphic card, and for sending and receiving data to and from the image display device 11. The image display device 11 comprises an input side data sending and receiving device 111, a device information storage device 112, an MPU identification processing device 113, an MPU storage device 114, and an output side data sending and receiving device 115. The image display device 12 and the image display device 13 have the same construction, but the reference symbols for each part are different from the part in display device 11. The construction of the image display system shown in FIG. 1 shows the characteristics of an image display system in a multiple monitor environment wherein a signal from the PC 10 is processed by each of the image display devices 11, 12 and 13, and reaches the image display device 13 last.

Next is a description of the operation of the image display system shown in FIG. 1. The MPU storage device 114 in the image display device 11 stores adjustment information of the image display device 11 and a unique number allocated to the device. The MPU identification processing device 113 acquires and retains the unique device number stored in the MPU storage device 114. The unique device number refers to a manufacturer's serial number stored when the image display device 11 was manufactured, an asset management number stored by a user of the image display device 11, or an individual device number arbitrarily allocated by the user of the image display device 11. Hereunder, the unique device numbers are designated device addresses.

Furthermore, the MPU identification processing device 113 acquires device information or the device address from a device information storage device 122 or an MPU identification processing device 123 in the image display device 12 according to the DDC communication protocol, using the output side data sending and receiving device 115. The device information storage device 122 stores the resolution and refresh rate that the image display device 12 can display, a vendor code allocated by manufacturer, the device name, the manufacturers' serial number, and the like, referred to as EDID (Extended Display Identification Data), and the MPU identification processing device 113 in the image display device 11 acquires this device information from the image display device 12.

Moreover, the MPU identification processing device 113 acquires EDID stored in the device information storage device 112, compares it with the EDID acquired from the image display device 12, extracts common data associated with image display such as display resolution, refresh rate and the like, and stores the extracted data in the device information storage device 112 as common EDID data of the image display device 11 and the image display device 12.

A similar operation is performed in the image display devices 12 and 13. The image display device 12 can acquire information from the image display device 13 connected to an output side data sending and receiving device 125. Since the image display device 13 connected last has no other device with which to perform DDC communication, it determines that there is no image display device on its output side data sending and receiving device 135.

Here, when the above-described operation is performed in order of the image display device 13 the image display device 12 the image display device 11, the optimal EDID in a multiple monitor environment where the three image display devices 11, 12 and 13 shown in FIG. 1 are connected is stored in the device information storage device 112 in the image display device 11 connected directly to the PC 10.

Next, a communication system between the image display devices 11, 12 and 13 will be described. Firstly, the method for the PC 10 to acquire the EDID by DDC is the same as in a conventional communication system. Data delivery between the PC 10 and the image display device 11 is performed according to the DDC communication protocol, by the administration and control device 101 of the PC 10 and the input side data sending and receiving device 111 of the image display device 11, and the administration and control device 101 acquires the EDID stored in the device information storage device 112. Since the EDID acquired by the administration and control device 101 of the PC 10 is the EDID extracted from each of the image display devices 11, 12 and 13 and stored in the aforementioned procedure, the PC 10 acquires the information as common EDID in a multiple monitor environment.

Figure 2A:
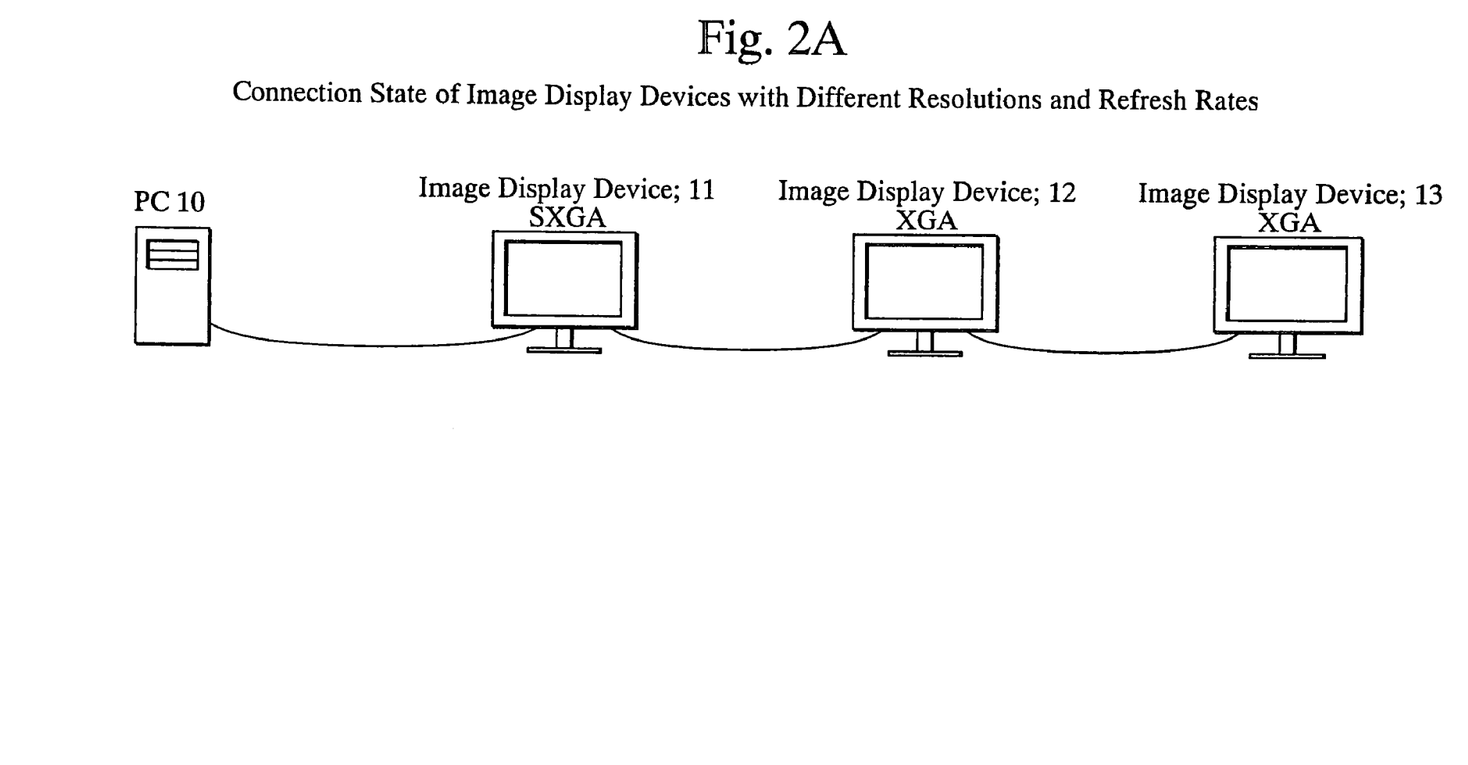
FIGS. 2A and 2B are explanatory diagrams showing a flow of EDID processing performed by the image display system shown in FIGS. 1 and 2A being a diagram showing connections between a PC and a plurality of image display devices, and FIG. 2B showing an EDID acquisition procedure.
Figure 2B:
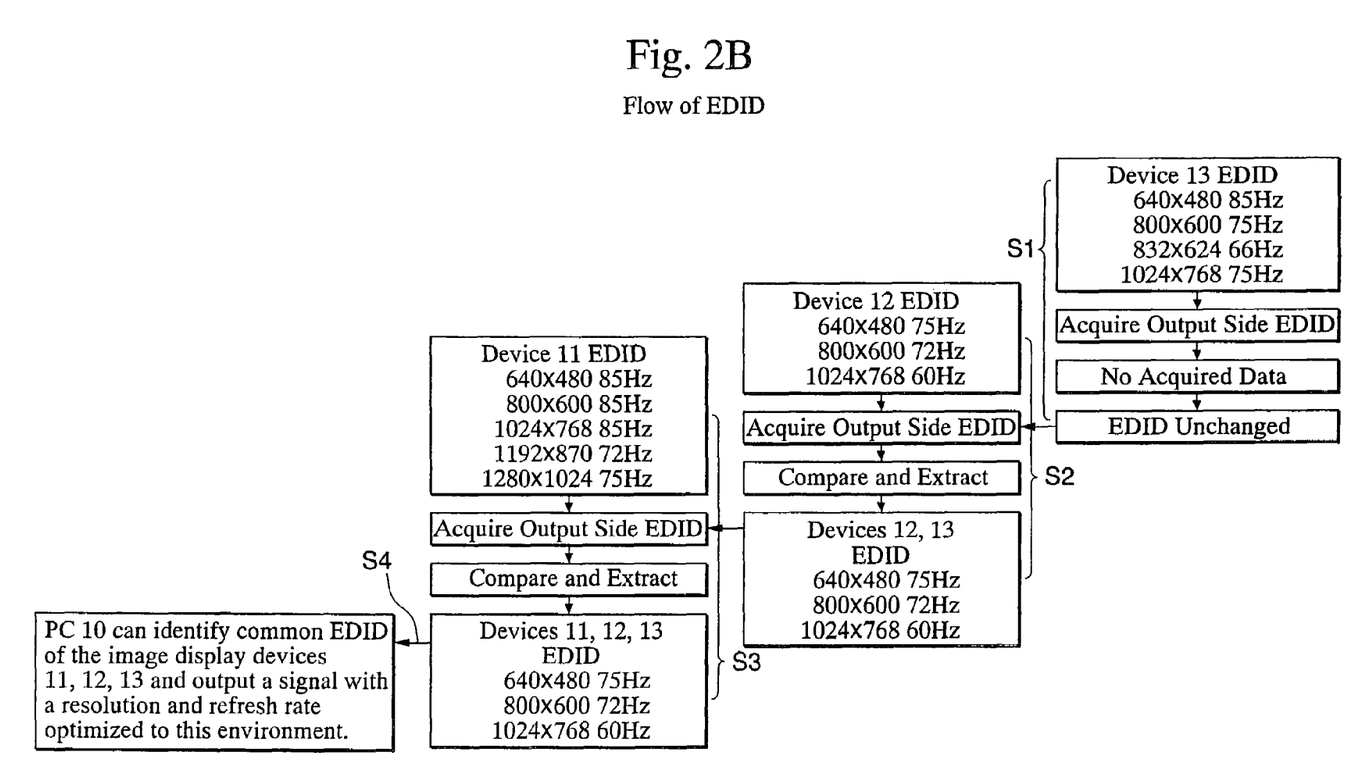

FIGS. 2A and 2B are explanatory diagrams showing the flow of EDID processing performed by the image display system shown in FIG. 1; FIG. 2A being a diagram showing connections between a PC and a plurality of image display devices, and FIG. 2B showing a procedure for acquiring EDID. That is, FIGS. 2A and 2B show the process from where EDID is extracted and stored from the three image display devices 11, 12 and 13 with different resolutions and refresh rates sequentially, to where the PC 10 acquires the common EDID.

Describing the process for obtaining the EDID in simple terms following the processing procedure of FIG. 2B, since there is no image display device connected on the output side, the image display device 13 has no acquired EDID data, so it sends its own EDID to the image display device 12 unchanged (step S1). The image display device 12 compares the EDID acquired from the image display device 13 with its own EDID, extracts common EDID, and sends the common EDID of the image display device 12 and the image display device 13 as common EDID (step S2). The image display device 11 compares the EDID acquired from the image display device 12 with its own EDID, extracts common EDID, and sends it to the PC 10 as common EDID of the image display device 11, the image display device 12 and the image display device 13 (step S3). As a result, the PC 10 identifies the obtained EDID as common EDID of the image display device 11, the image display device 12 and the image display device 13, and outputs a signal with a resolution and refresh rate optimized to this multiple monitor environment to the display device 11 (step S4).

Next is a description of the method for the PC 10 to control the image display devices using DDC, referred to as DDC-CI (Display Data Channel Command Interface). This method of controlling image display devices by DDC-CI is performed using DDC-CI commands similar to those used in a typical conventional communication system with a device address of the present invention appended. In addition, the PC 10 must know the device addresses allocated to the image display devices 11, 12 and 13. However, assuming that it has already acquired the device addresses, the method of controlling the image display device 13 will be described using the block diagram of the image display system shown in FIG. 1 and the flow chart of FIG. 3.

Figure 3:
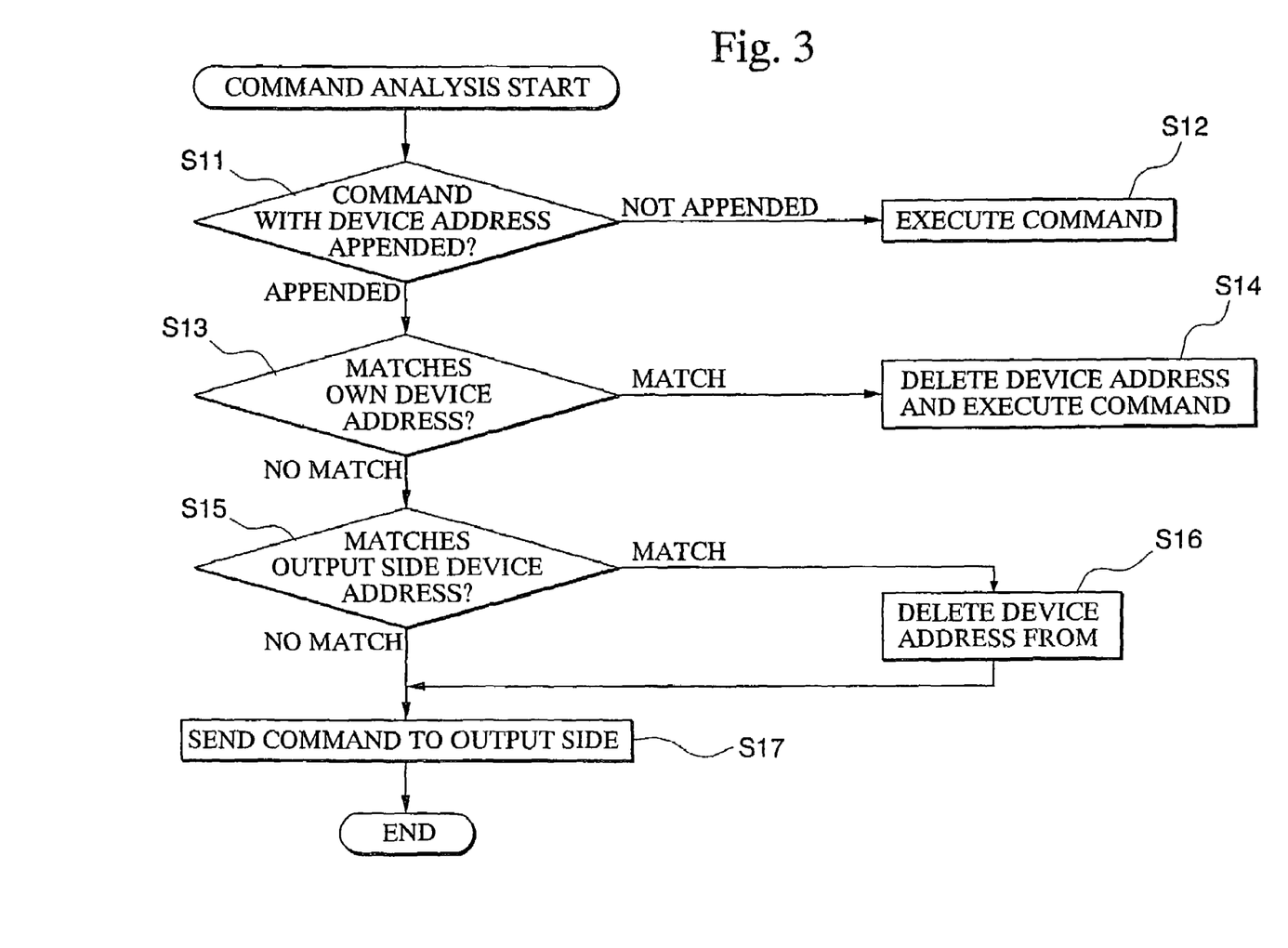
FIG. 3 is a flow chart showing a flow of command analysis processes associated with device control in the image display system shown in FIG. 1.

FIG. 3 is a flow chart showing the flow of command analysis processes associated with device control in the image display system shown in FIG. 1. A DDC-CI command with the device address of the image display device 13 appended is sent from the administration and control device 101 of the PC 10 to the image display device 11. Then, in the image display device 11, the MPU identification processing device 113 receives this DDC-CI command using the input side data sending and receiving device 111, and analyzes the received command.

At this time, the MPU identification processing device 113 of the image display device 11 determines whether the received command has a device address appended or not (step S11). Here, if a device address is not appended, the received command is executed (step S12). If a device address is appended, it is determined whether it matches the device address of the image display device 11 or not (step S13), and if it matches its own device address, the device address appended to the command is deleted, and then the received command is executed (step S14). On the other hand, if it does not match its own device address, it is determined whether or not it matches the device address of the output side data sending and receiving device 115 of the image display device 11 (step S15). Here, if it matches the device address on the output side, the device address is deleted from the command (step S16), and if it does not match the device address on the output side, the command is sent to the output side data sending and receiving device 115 with no change (step S17).

In this command analysis processes, since the device address in the command is different from the device address of the image display device 11, and also different from the device address of the image display device 12, the MPU identification processing device 113 sends the command to the image display device 12 in the processing of step S17 using the output side data sending and receiving device 115.

Furthermore, the image display device 12 receives DDC-CI commands using the input side data sending and receiving device 121, and the MPU identification processing device 123 performs command analysis processes as shown in the flow chart of FIG. 3 on the received DDC-CI command similarly to the above description.

In step S16 of the command analysis processes shown in FIG. 3, in the case where the device address in the command is different from the device address of the image display device 12, but matches the device address of the image display device 13, processing to generate a command with the device address deleted from the DDC-CI command is performed, and processing to send the command to the image display device 13 is performed in step S16, using the output side data sending and receiving device 125 of the image display device 12.

Furthermore, in the image display device 13, an MPU identification processing device 133 receives this DDC-CI command using an input side data sending and receiving device 131, and performs command analysis processes as shown in the flow chart of FIG. 3 on the received command similarly to the above description. In command analysis processes in the image display device 13, since there is no device address in the DDC-CI command, it is determined to be a communication system using conventional DDC, and the DDC-CI command is executed with no change as shown in the processing from step S11 to step S12.

Figure 4A:
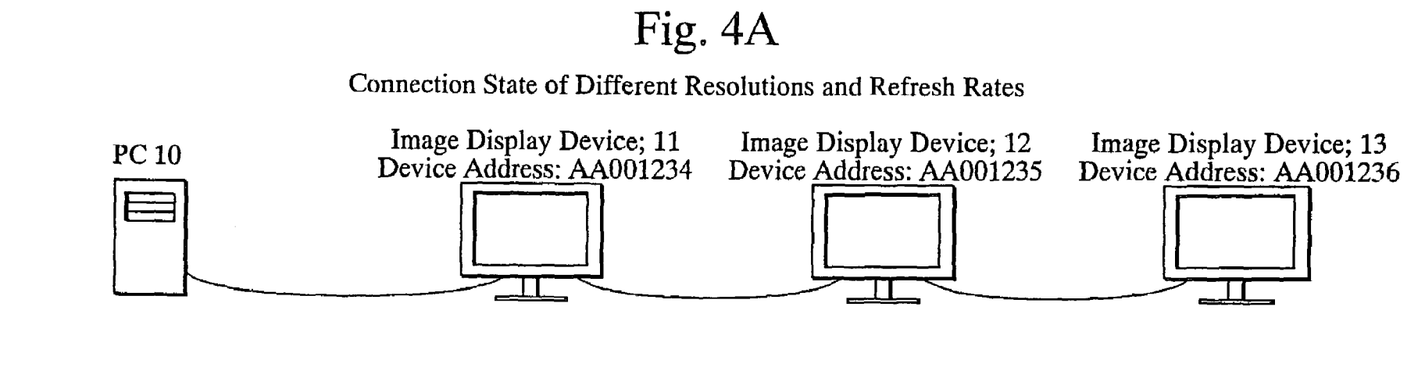
FIG. 4A being a diagram of connections between a PC and a plurality of image display devices, FIG. 4B showing a flow of DDC-CI data setting commands, and FIG. 4C showing a flow of DDC-CI data acquisition commands.
Figure 4B:
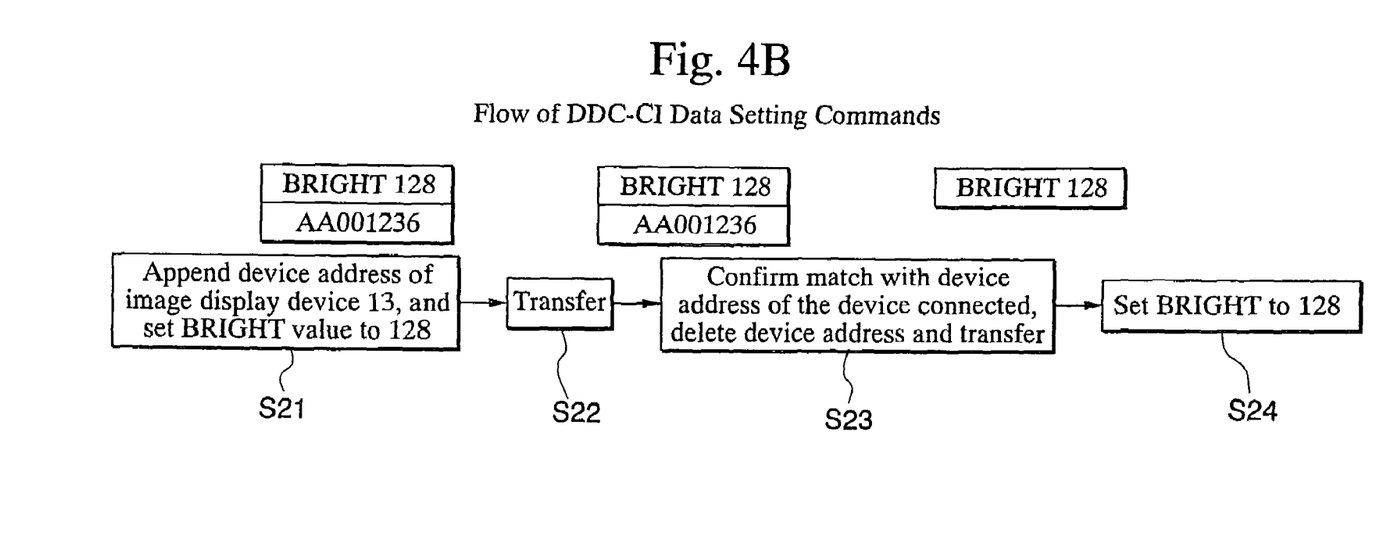
Figure 4C:
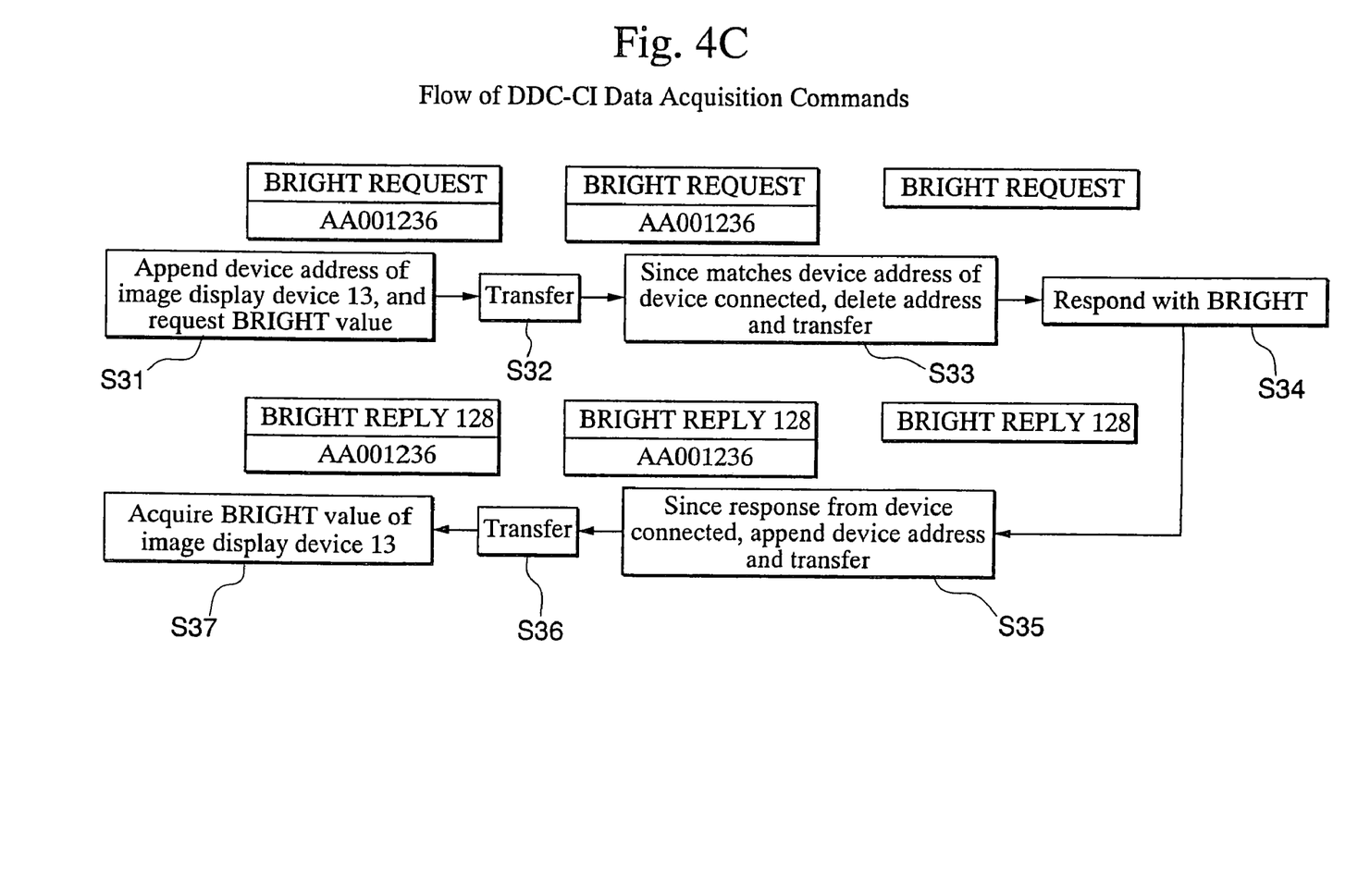

FIG. 4 is an explanatory diagram of a case where the image display system shown in FIG. 1 performs command analysis processes associated with device control; (a) being a diagram of the connections between a PC and a plurality of image display devices, (b) showing a flow of DDC-CI data setting commands, and (c) showing a flow of DDC-CI data acquisition commands. That is, this figure shows an example wherein the image display system performs command analysis processes of a DDC-CI command with a device address appended.

As shown in FIG. 4A, in the case where the PC 10 and the image display devices 11, 12 and 13 are connected in series, the flow of DDC-CI data setting commands as shown in FIG. 4B in the figure is as follows. Firstly, if the PC 10 appends the device address of the image display device 13, sets the "BRIGHT value" to "128", then transfers it to the image display device 11 (step S21), this information is further transferred to the image display device 12 (step S22), and after confirming that it matches the device address of the device connected, it is transferred to the image display device 13 with the device address being deleted (step S23), and the "BRIGHT value" in the image display device 13 is set to "128" (step S24).

Furthermore, the flow of DDC-CI data acquisition commands as shown in FIG. 4C in the figure is as follows. Firstly, if the PC 10 appends the device address of the image display device 13, and requests the "BRIGHT value" from the image display device 11 (step S31), this information is transferred to the image display device 12 (step S32). Since it matches the device address of the device connected, it is transferred to the image display device 13 with the device address being deleted (step S33). Then, when the image display device 13 responds to the image display device 12 with the "BRIGHT value" (step S34), since it is a response from the connected device, the image display device 12 appends the device address, and transfers it to the image display device 11 (step S35). This information is transferred from the image display device 11 to the PC 10 (step S36), and the PC 10 acquires the "BRIGHT value" of the image display device 13. In this manner, when the PC 10 requests the "BRIGHT value" from the image display device 11, it is transferred to the image display device 12, so that even in a case where a response is required to a DDC-CI command sent from the PC 10, since the received image display device appends a device address, it is possible to respond to the PC 10.

According to the operation of the first embodiment of an image display system as described above, image display devices communicate with each other in a multiple monitor environment. Thus a PC can generate a display output with optimum frequency and refresh rate in a multiple monitor environment. Furthermore, since duplex communication is possible between a PC and a plurality of connected image display devices, a user can use similar functions as conventional plug and play and remote control. Moreover, such functions can be realized by software processing without adding and changing hardware on the PC side.

Second Embodiment

Figure 5A:
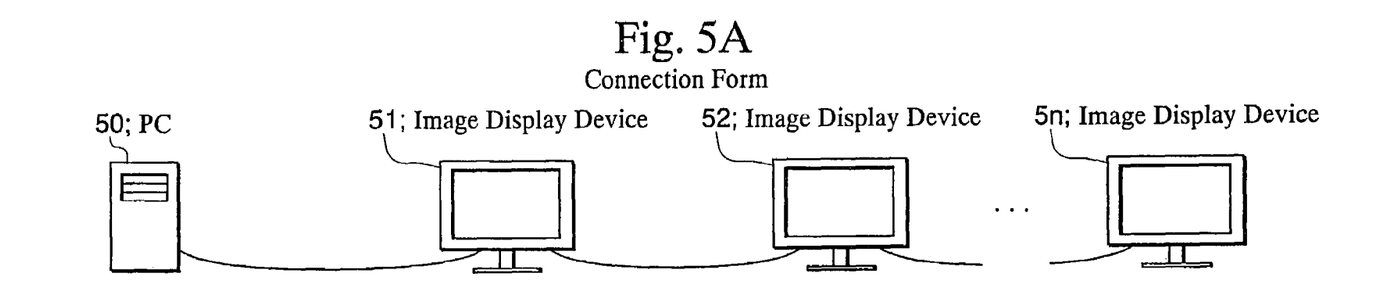
FIG. 5A showing the connection state of the image display system, and FIG. 5B showing a flow of power off processing of the image display devices.
Figure 5B:
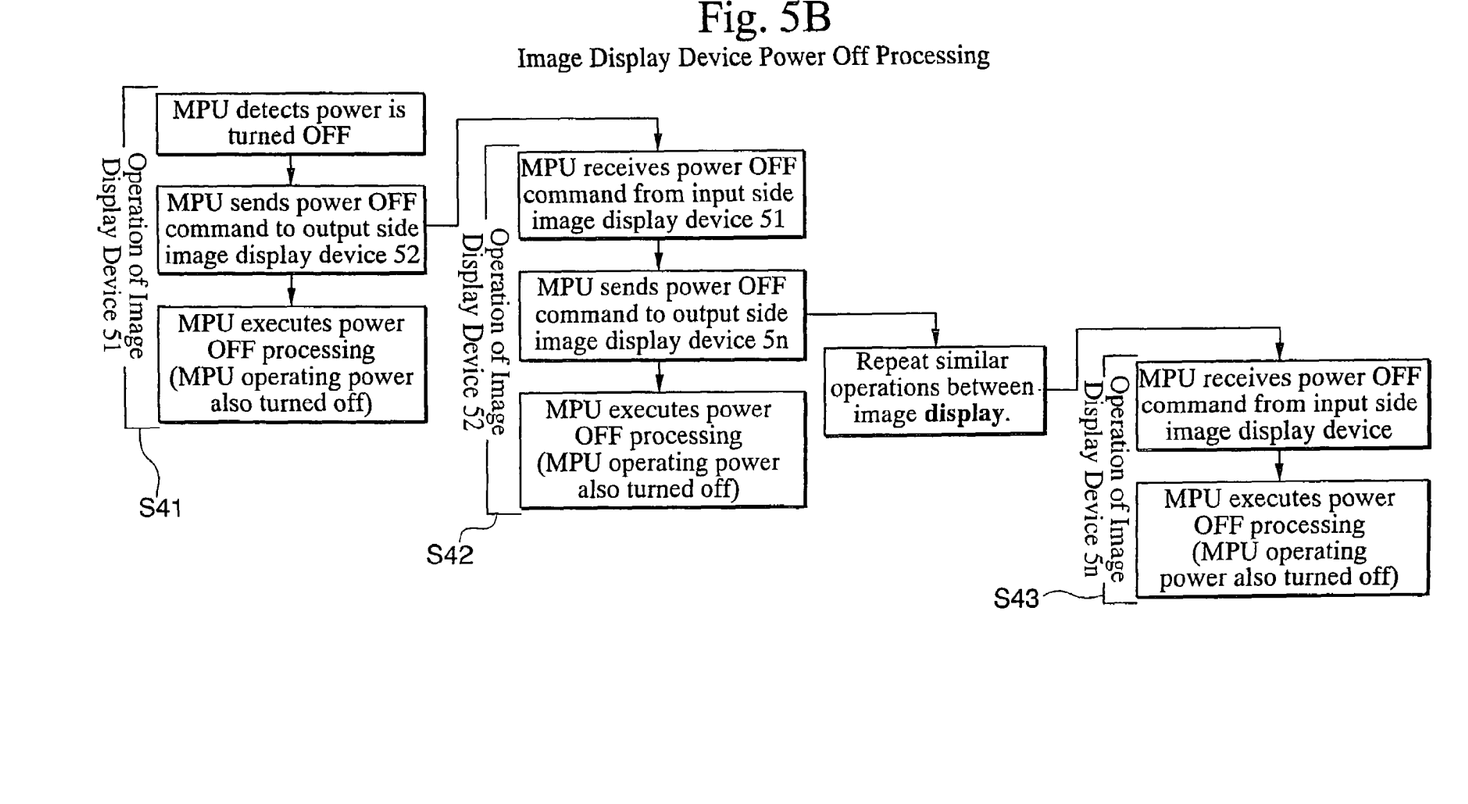

FIGS. 5A and 5B are diagrams showing a device control procedure of an image display system according to a second embodiment of the present invention; FIG. 5A showing the connection state of the image display system, and FIG. 5B showing a flow of power off processing of the image display devices. As shown in FIG. 5A, a PC 50 and image display devices 51, 52 . . . 5n are connected in series. Furthermore, as shown in FIG. 5B, step S41 shows a flow of the operation of the image display device 51, step S42 shows a flow of the operation of the image display device 52, and step S43 shows a flow of the operation of the image display device 5n. When the power of the image display device 51 is off, the power of the image display devices 52 . . . 5n can also be turned off automatically.

Hereunder is a description of the power off operation of the image display devices 51, 52 . . . 5n in FIGS. 5A and 5B. Firstly, as shown in step S41, when a user of the image display system turns the power switch of the image display device 51 off, an MPU identification processing device (not shown in the figure) in the image display device 51 detects that the power switch is turned off, and sends a device power switch off control command to the image display device 52 connected to an output side data sending and receiving device (not shown in the figure) by a communication system using DDC. Furthermore, after confirming that the image display device 52 has received the command, processing is performed to turn off the power of the image display device 51. As a result, the power of the image display device 51 is turned off. At this time, the operating power of the MPU identification processing device is also turned off.

Subsequently, as shown in step S42, when an MPU identification processing device (not shown in the figure) in the image display device 52 receives a device power off control command from the image display device 51, it sends the device power off control command to the image display device 5n connected to an output side data sending and receiving device (not shown in the figure) by a communication system using DDC, and after confirming that the command is received, processing is performed to turn off the power of the image display device 52. As a result, the power of the image display device 52 is turned off. At this time, the operating power of the MPU identification processing device is also turned off.

In this manner, all of the image display devices connected repeat the same operation as the image display device 52, and finally as shown in step S43, an MPU identification processing device (not shown in the figure) in the $n^{th}$ image display device 5n receives a device power off control command from the immediately prior image display device, and performs processing to turn off the power of the image display device 5n. As a result, the power of the image display device 5n is turned off, and the power of all of the image display devices in a multiple monitor environment are turned off. At this time, the operating power of the MPU identification processing device is also turned off. Accordingly, a user can turn off the power of other image display devices automatically by turning off the power of only one image display device.

The above-described operation concerns turning the power off of image display devices. By using similar methods, it is possible to make all of the image display devices in a multiple monitor environment perform automatic adjustment functions, and use an adjustment function in one image display device to operate and adjust image display devices connected to it remotely. Thus it is also possible to provide a system that can be controlled remotely between only image display devices without using a PC.

Third Embodiment

Figure 6:
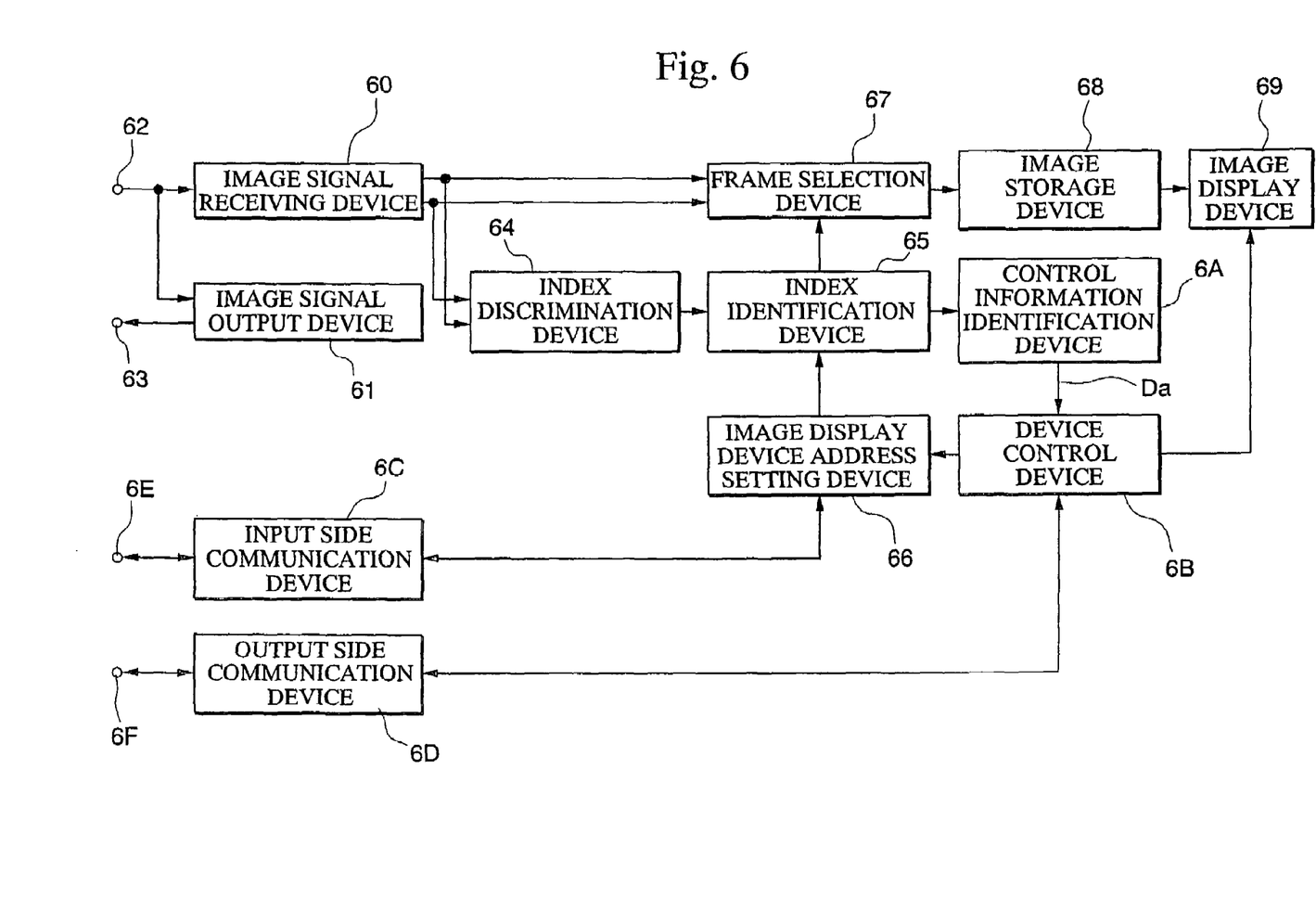
FIG. 6 is a block diagram showing the structure of an image display system according to a third embodiment of the present invention.

FIG. 6 is a block diagram showing the structure of an image display system according to a third embodiment of the present invention. That is, FIG. 6 shows a structure of an image display system, which has a communication system of the present invention added to the image display system in Japanese Unexamined Patent Application, First Publication No. 2000-352962. In this image display system, in addition to an image signal input terminal 62, an image signal output terminal 63, an image signal receiving device 60, an image signal output device 61, an index discrimination device 64, an index identification device 65, an image display device address setting device 66, a frame selection device 67, an image storage device 68, and an image display device 69, there is further added a control information identification device 6A, a device control device 6B, an input side communication device 6C, and an output side communication device 6D.

The image signal input terminal 62 is input an image signal in which an index signal is added in place of part of the image signal, and vertical and horizontal synchronization signals synchronized with this image signal, as a composite signal. Part of the image signal input to the image signal input terminal 62 is output outside the image display system by the image signal output terminal 63. The image signal receiving device 60 receives a composite signal containing an image signal comprising a plurality of image frames, a synchronization signal corresponding to the image signal, and an index signal that is added in place of part of the image signal to an arbitrary image frame of the image signal, separates the image signal, the synchronization signal and the composite signal from the received composite signal, and outputs them. Part of the image signal input to the image signal receiving device 60 is output externally by the image signal output device 61.

The index discrimination device 64 discriminates an index signal from an effective display region signal and image signal, and outputs the discriminated index signal.

The index identification device 65 outputs a frame selection signal for selecting an image frame contained in the image signal, based on the index signal output from the index discrimination device 64, and the image display device address of its own image display device output from the image display device address setting device 66. The image display device address setting device 66 outputs an image signal display device address established for its own image display device. The frame selection device 67 selects an image frame contained in the image signal based on a frame selection signal output from the index identification device 65. The image storage device 68 stores an image signal corresponding to the image frame output from the frame selection device 67. The image display device 69 displays an image signal corresponding to the image frame extracted from the image storage device 68.

Furthermore, the control information identification device 6A, which is added in the present invention, acquires control information from the index signal of the index identification device 65. Moreover, the device control device 6B acquires control information from the index signal, analyzes information obtained by the input and output communication control of the input side communication device 6C and output side communication device 6D, and controls the address of the image display device address setting device 66 and a range of settings in the image display device. Furthermore, the input side communication device 6C is a communication device using DDC on the input side, and the output side communication device 6D plays a role as a communication device using DDC on the output side. In addition, 6E denotes a DDC input terminal, and 6F denotes a DDC output terminal.

A description of the operation of the block section constructed in Japanese Unexamined Patent Application, First Publication No. 2000-352962 is omitted, and the operation of the block section added to the present invention will be described. Device control information contained in the index signal is extracted in the control information identification device 6A, and this device control information Da is read by the device control device 6B. This device control information Da is either control information used to set an image display device address, or request data from the PC outputting the index signal to acquire display position, expansion, color, or stored data, for instance. The data is analyzed to determine what method should be used to process the data in the device control device 6B, and the request from the PC is processed using the control device in the image display device.

Furthermore, as a result of analyzing the device control information Da, the device control device 6B converts data that requires a response to the PC into Di, and converts data to be passed to another image display device into Do. In addition, the data is delivered using the input side communication device 6C or the output side communication device 6D. This data delivery is realized by the image display devices communicating with each other even in a multiple monitor environment as described in the first embodiment.

According to the third embodiment of an image display system, remote control of image display devices by indexes is realized. Moreover it is possible to respond to a PC with remote control results, adjustment values in the image display devices, status information of the image display devices, or the like, so that it is possible for a user to use the system satisfactorily even in a multiple monitor environment, using indexes.

Fourth Embodiment

Figure 7:
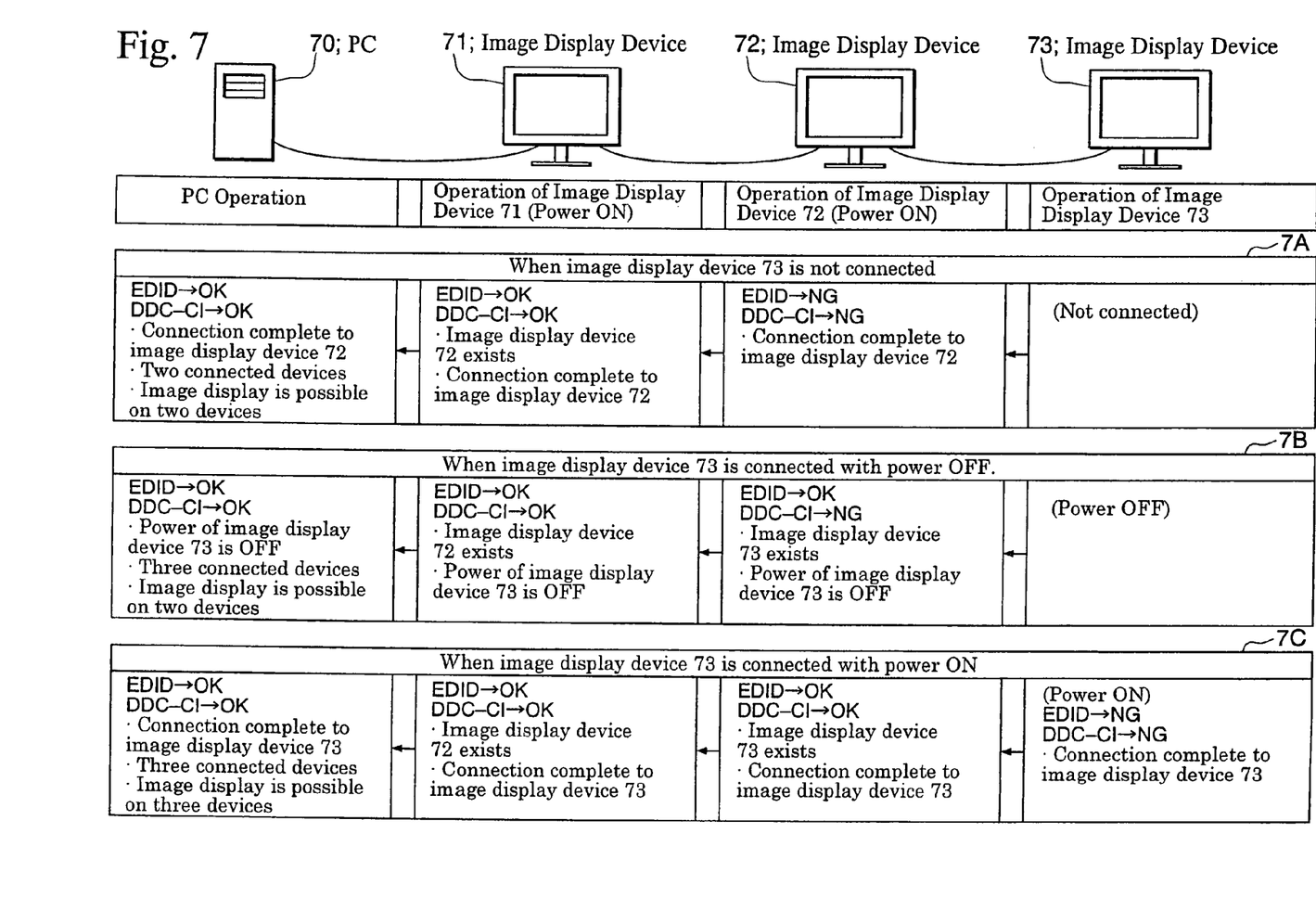
FIG. 7 shows the structure and operation flow of an image display system according to a fourth embodiment of the present invention.

FIG. 7 shows the structure and operation flow of an image display system according to a fourth embodiment of the present invention. That is, this figure shows an overview of an image display system using a communication system applied to the present invention, and its operation flow. A PC 70 incorporating a device for reading EDID data by DDC, and an image display device control device, called DDC-CI, series connects image display devices 71, 72 and 73 incorporating a communication system applied to the present invention. Furthermore, 7A, 7B and 7C show the states of conditions such as not connected, power off, and power on, of the image display device 73.

Firstly, in a state in which the image display device 73 is not connected, since the image display device 72 cannot read EDID data from its output side terminal, it detects that no image display device is connected on the output side due to having no response to a DDC-CI image display device command. In the case where the image display device 71 requests information about the connection state from the image display device 72, it is informed that connection is only made to the image display device 72. Furthermore, in the case where the PC 10 requests information about the connection state from the image display device 71, it is informed that connection is only made to the image display device 72. As a result, the PC 70 can determine that the image display device 71 and the image display device 72 are connected, and that the power is on to the two devices.

Next, in a state in which the image display device 73 is connected, but the power is off as shown in 7B, the image display device 72 can acquire the EDID data of the image display device 73, but detects that the power of the image display device 73 is off since there is no response to a DDC-CI image display device control command. In the case where the image display device 71 requests information about the connection state from the image display device 72, it is informed that the power of the image display device 73 is off, and in the case where the PC 70 requests information about the connection state from the image display device 71, it is informed that the power of the image display device 73 is off. As a result, it is determined that the image display devices 71, 72 and 73 are connected to the PC 70, that the power is on to the image display devices 71 and 72, and that the power of the image display device 73 is off.

Furthermore, in a state in which the image display device 73 is connected, and the power is on as shown in 7C, since the image display device 73 cannot read EDID data from its output side terminal, and there is no response to a DDC-CI image display device command, it detects that no image display device is connected to the output side. At this time, in the case where the image display device 72 requests information about the connection state from the image display device 73, it is informed that connection is only made to the image display device 73. Furthermore, in the case where the image display device 71 requests information about the connection state from the image display device 72, it is informed that connection is only made to the image display device 73. Moreover, in the case where the PC 70 requests information about the connection state from the image display device 71, it is informed that connection is only made to the image display device 73 similarly. As a result, it is determined that the image display devices 71, 72 and 73 are connected to the PC 70, and that the power is on to the image display devices 71, 72 and 73.

According to the image display system of the fourth embodiment, the above-described operations enable the connection states and power off/on states of each of the image display devices 71, 72 and 73 to be identified, so that the PC 70 can have a device for administrating the number of image display devices, and inform a user of problems such as the power of an image display device being turned off for some reason, or being cut off while connected. Thus it is possible to provide an easy to use image display system in a multiple monitor environment.

Fifth Embodiment

Figure 8A:
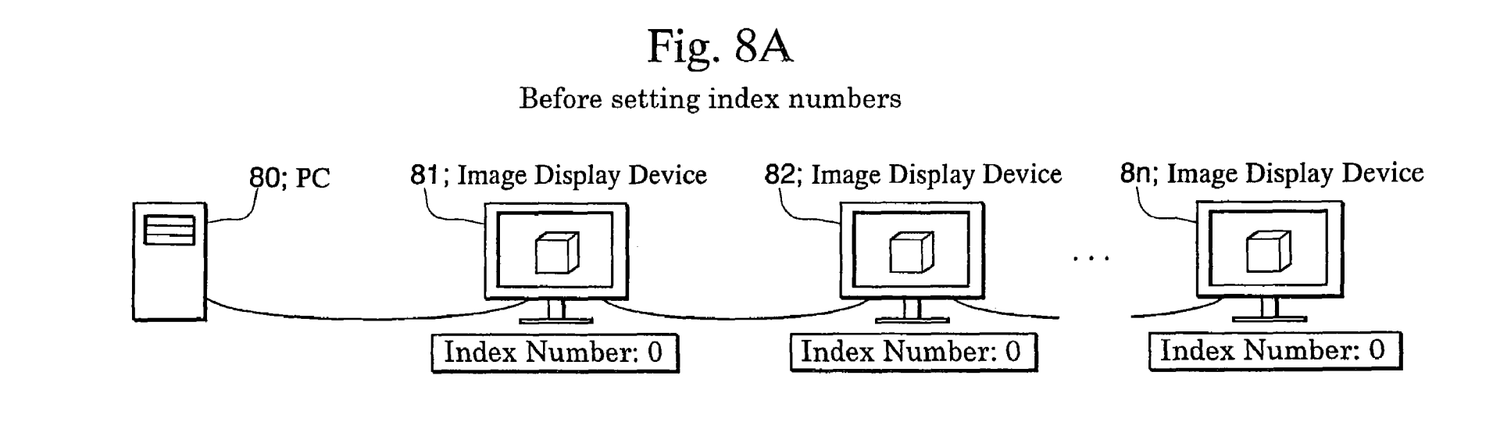
FIG. 8A being a structural diagram of the connections of the image display system before setting index numbers, FIG. 8B being a flow chart showing an index number setting procedure, and FIG. 8C being a structural diagram of the connections of the image display system after index number setting.
Figure 8B:
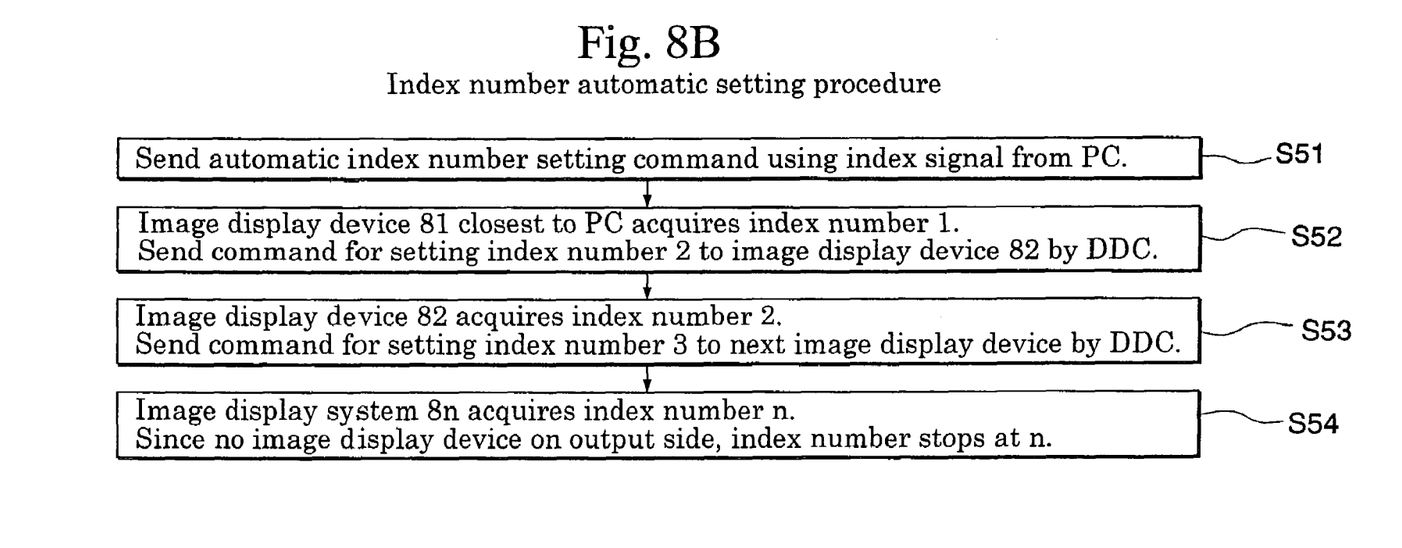
Figure 8C:
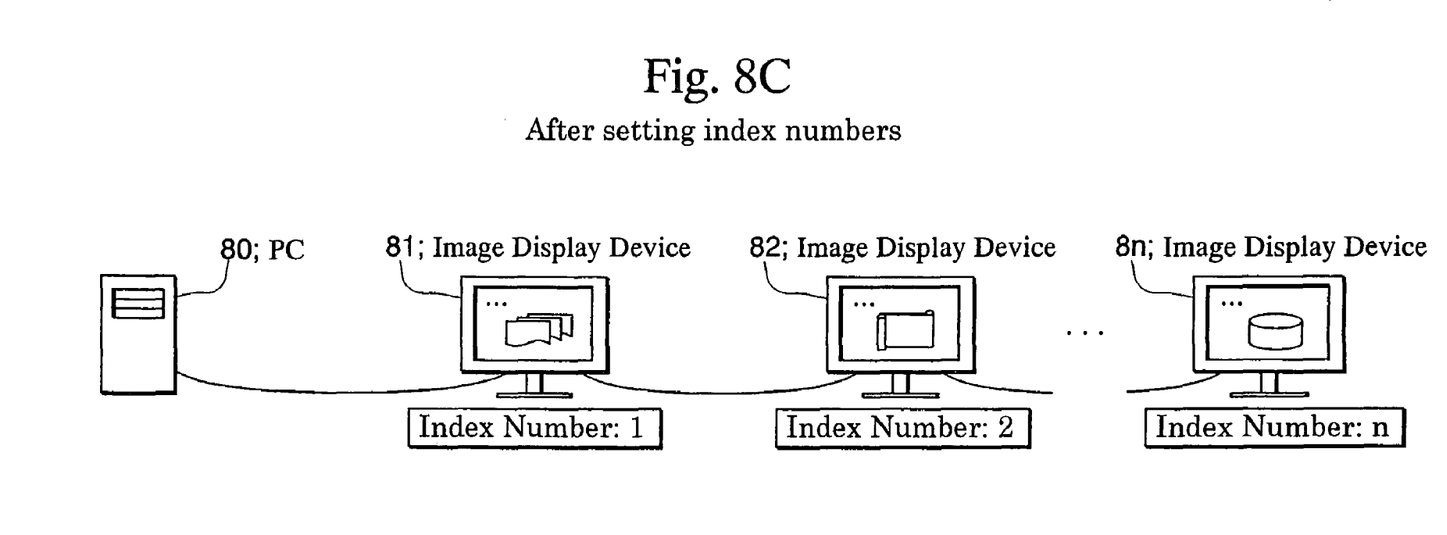

FIGS. 8A to 8C show the structure and operation flow of image display systems according to a fifth embodiment of the present invention; 8A being a structural diagram of the connections of the image display system before setting index numbers, 8B being a flow chart showing an index number setting procedure, and 8C being a structural diagram of the connections of the image display system after setting index numbers. That is, this figure shows schematically an image display system in which the image display system described in Japanese Unexamined Patent Application, First Publication No. 2000-352962 has a communication system of the present invention added, and its operation flow.

As shown in FIG. 8A, before setting index numbers, a PC 80 is connected to n image display devices 81, 82 ... 8n with all of the index numbers being 0. Furthermore, as shown in FIG. 8C, after setting index numbers, the PC 80 is connected to n image display devices 81, 82 ... 8n with index numbers 1, 2 ... n. Moreover, the flow chart of FIG. 8B shows a process by which the index numbers are allocated by commands.

In this image display system, the PC 80 contains, and administrates, a plurality of pages, and generates a composite signal with each page containing an allocated index signal. Furthermore, an image display device can determine, from a received index signal, whether a signal is for it to display or not, and since the image display devices 81, 82 ... 8n have different numbers, they can display different images. Numbers of image display devices, which are necessary to display different images, are set by an automatic setting method using a communication system of the present invention. Hereunder is a description of such an automatic setting method using the flow chart of FIG. 8B.

The initial state of the image display system is such that none of the image display devices 81, 82 ... 8n has a device address (that is index number) allocated, and the image display devices 81, 82 ... 8n all display image signals output from the PC 80.

Here, in order to set index numbers automatically, the PC 80 firstly sends automatic index number setting commands to the image display devices 81, 82 ... 8n using index numbers (step S51). In this manner, n image display devices 81, 82 ... 8n receive an automatic index number setting command, and the image display device 81 connected at the closest location to the PC 80 among the n devices acquires it and is set to index number 1. Furthermore, using DDC, a command is sent for setting the image display device 82 to index number 2 (step S52). Regarding whether the image display device 81 itself is the image display device connected at the closest location to the PC 80, or not, since image display devices of the present invention have mutual communication devices between them as described in the above embodiments, then this can be determined by communication data between only image display devices not arriving on the input side of the image display device, or by checking how many image display devices are connected on the output side.

Next, the image display device 82 acquires and is set to index number 2, and furthermore, sends a command using DDC to set an image display device connected on its output side, to a number that is the index number allocated to itself plus one (step S53). Repeating a similar operation, the image display device 8*n* acquires and is set to index number n, and terminates automatic index number setting since there is no image display device connected on its output side (step S54). As a result, different index numbers are set to n image display devices 81, 82 . . . 8*n*, as shown in FIG. 8C.

Using the operations as described above, it is possible to set index numbers automatically, thus avoiding an operation to set index numbers to each of a plurality of image display devices, so that it is possible to provide an easy to use image display system in a multiple monitor environment.

The embodiments as described above are examples to explain the present invention, but the present invention is not limited to the above-described embodiments, and various modifications are possible within the scope of the gist of the invention. For example, in the above-described embodiments, an automatic number setting method is described which uses device control information in an index signal, according to the invention in Japanese Unexamined Patent Application, First Publication No. 2000-352962. However, the present invention is not limited to this, and even in a case where a PC sends an automatic number setting command using DDC-CI, automatic setting can be performed similarly by image display devices communicating between each other.

The invention claimed is:

1. An image display system for realizing a multiple monitor system, incorporating an input interface and an output interface, said image display system comprising:
    a data sending and receiving device which sends and receives device infonnation to and from image display devices connected in series to said input interface and said output interface, said image display devices being driven simultaneously,
    an identification processing device which analyzes and processes data acquired by said data sending and receiving device, and
    a storage device which stores control information and specification information of said image display devices, and device addresses allocated to said image display devices,
    wherein said identification processing device reads specification information from image display devices connected to an output interface by using said data sending and receiving device, extracts data common to its own specification data to edit its own specification data, and stores the edited specification data in said storage device.

2. An image display system according to claim 1, wherein said data sending and receiving device delivers data according to a DDC (Display Data Channel) communication procedure.

3. An image display system according to claim 1, wherein said device addresses are selected from manufacturers' serial numbers of said image display devices, asset management numbers of said image display devices, and arbitrarily allocated numbers allocated to said image display devices, and said data sending and receiving devices deliver data using said device addresses.

4. An image display system according to claim 2, wherein said device addresses are selected from manufacturers' serial numbers of said image display devices, asset management numbers of said image display devices, and arbitrarily allocated numbers allocated to said image display devices, and said data sending and receiving devices deliver data using said device addresses.

5. An image display system according to claim 1, wherein said identification processing device identifies whether image display devices are connected to an output interface by using said data sending and receiving device, and identifies an operating state of the image display devices connected to the output interface.

6. An image display system according to claim 2, wherein said identification processing device identifies whether image display devices are connected to an output interface by using said data sending and receiving device, and identifies an operating state of the image display devices connected to the output interface.

7. An image display system according to claim 3, wherein said identification processing device identifies whether image display devices are connected to an output interface by using said data sending and receiving device, and identifies an operating state of the image display devices connected to the output interface.

8. An image display system according to claim 4, wherein said identification processing device identifies whether image display devices are connected to an output interface by using said data sending and receiving device, and identifies an operating state of the image display devices connected to the output interface.

9. An image display system according to claim 1, wherein said identification processing device remotely controls image display devices connected to an output interface using said data sending and receiving device.

10. An image display system according to claim 8, wherein said identification processing device remotely controls image display devices connected to an output interface using said data sending and receiving device.

11. An image display system according to claim 1, further comprising a response device which processes index control responses in a multiple monitor environment using indexes, even when it is not physically connected to a host computer.

12. An image display system according to claim 10, further comprising a response device which processes index control responses in a multiple monitor environment using indexes, even when it is not physically connected to a host computer.

* * * * *